United States Patent [19]

Mai et al.

[11] Patent Number: 5,329,765
[45] Date of Patent: Jul. 19, 1994

[54] EXHAUST PIPE ASSEMBLY FOR TREATING THE EXHAUST OF AN INTERNAL COMBUSTION ENGINE

[75] Inventors: Sung-Chuan Mai; Kong-Ming Mai, both of Kaohsiung, Taiwan

[73] Assignee: Sung-Chuan Mai et al., Kaohsiung, Taiwan

[21] Appl. No.: 7,562

[22] Filed: Jan. 22, 1993

[51] Int. Cl.⁵ .................................................. F01N 3/02
[52] U.S. Cl. .................................. 60/311; 55/268; 55/269; 55/477; 55/DIG. 30
[58] Field of Search ................... 60/311; 55/268, 269, 55/477, DIG. 30

[56] References Cited

U.S. PATENT DOCUMENTS

| | | | |
|---|---|---|---|
| 2,301,529 | 11/1942 | Fagan | 55/269 |
| 2,802,544 | 8/1957 | Lewis | 55/477 |
| 3,435,597 | 4/1969 | Levy | 55/269 |
| 3,860,403 | 1/1975 | Aoi | 55/269 |

FOREIGN PATENT DOCUMENTS

| | | | |
|---|---|---|---|
| 2316875 | 11/1973 | Fed. Rep. of Germany | 55/DIG. 30 |
| 944991 | 11/1948 | France | 55/477 |

*Primary Examiner*—Douglas Hart
*Attorney, Agent, or Firm*—Bucknam and Archer

[57] ABSTRACT

An exhaust pipe assembly is composed of a circuitous filter route surrounded by a cooling water container for treating the exhaust out of an internal combustion engine, permitting the exhaust to be cooled down, the noise generated to be muffled, and solid particles containing in the exhaust to be removed. The exhaust pipe assembly may be cleaned by the cleaner for exhaust pipe disclosed in U.S. Pat. No. 5,074,007.

10 Claims, 6 Drawing Sheets

EXHAUST PIPE ASSEMBLY FOR TREATING THE EXHAUST OF AN INTERNAL COMBUSTION ENGINE

The present invention relates to an exhaust pipe assembly for treating the exhaust of an internal combustion engine, more precisely, the present invention relates to an exhaust pipe assembly which may permit the temperature of the exhaust to be cooled down, the noise generated by the exhaust to be muffled, and the dirt containing in the exhaust to be removed.

BACKGROUND OF THE INVENTION

Normally, the prior art exhaust pipe of an internal combustion engine is simply to guide the exhaust of the internal combustion engine into the air without passing through a filtering process. But the exhaust usually carries heat and dirty substances to pollute the air. Even more, the internal combustion engine is widely utilized in all industries so that it brings on a serious problem of air pollution.

SUMMARY OF THE INVENTION

An exhaust pipe assembly according to the present invention is generally composed of a cooling water container surrounded around a circuitous route. The circuitous route has an inlet for connecting the exhaust pipe line of an internal combustion engine and an outlet end for moving out the cleaned exhaust. Brush filter elements are disposed inside the circuitous route for removing dirt from the exhaust. As the exhaust passes through the circuitous route, it is cooled down by the cooling water in the water container so that part of the dirt may stay on the wall surface of the circuitous route. Because the pressure of the exhaust may be gradually reduced and the water container may resist shocks and vibrations, the noise resolting from high pressure exhaust may be muffled.

An object of the present invention is to provide an exhaust pipe assembly which may cool down the temperature of the exhaust, slow down the flowing speed of the exhaust and permit the dirt to be removed from the exhaust.

Another object of the present invention is to provide an exhaust pipe assembly which may eliminate shocks and vibrations induced by the exhaust, and reduce the pressure of the exhaust so that the noise generated may be muffled.

BRIEF DESCRIPTION OF THE DRAWINGS

The present invention will be further illustrated, by way of examples, with reference to the annexed drawings, in which:

FIG. 2 is a top view of the lower water container of the exhaust pipe assembly of FIG. 1 showing the moving direction of the exhaust passing through;

DETAILED DESCRIPTION OF THE PREFERRED EMBODIMENTS

Figure 1:
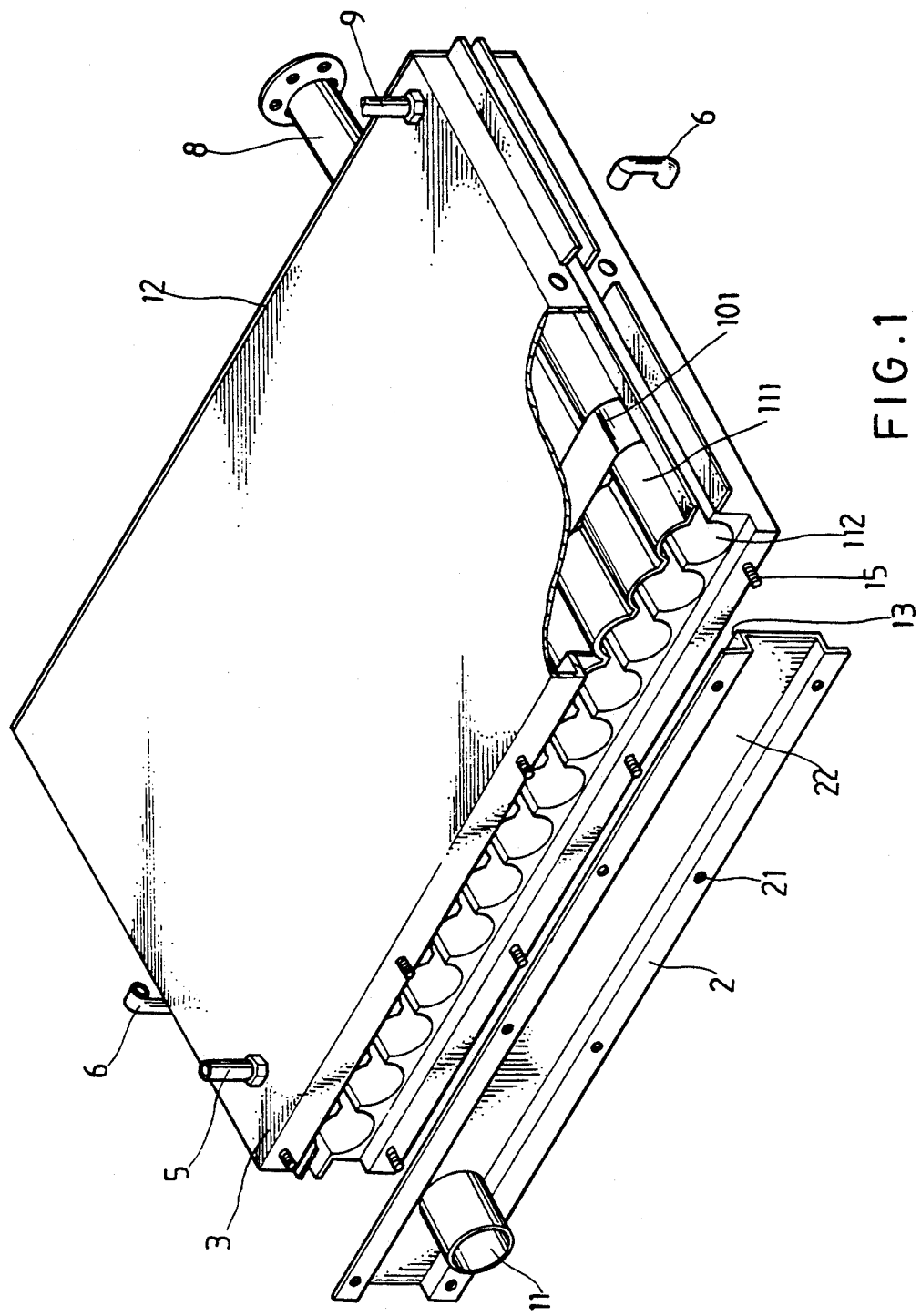
FIG. 1 is a perspective, partly exploded and partly cut-off view of a first embodiment of the exhaust pipe assembly of the present invention.
Figure 2:
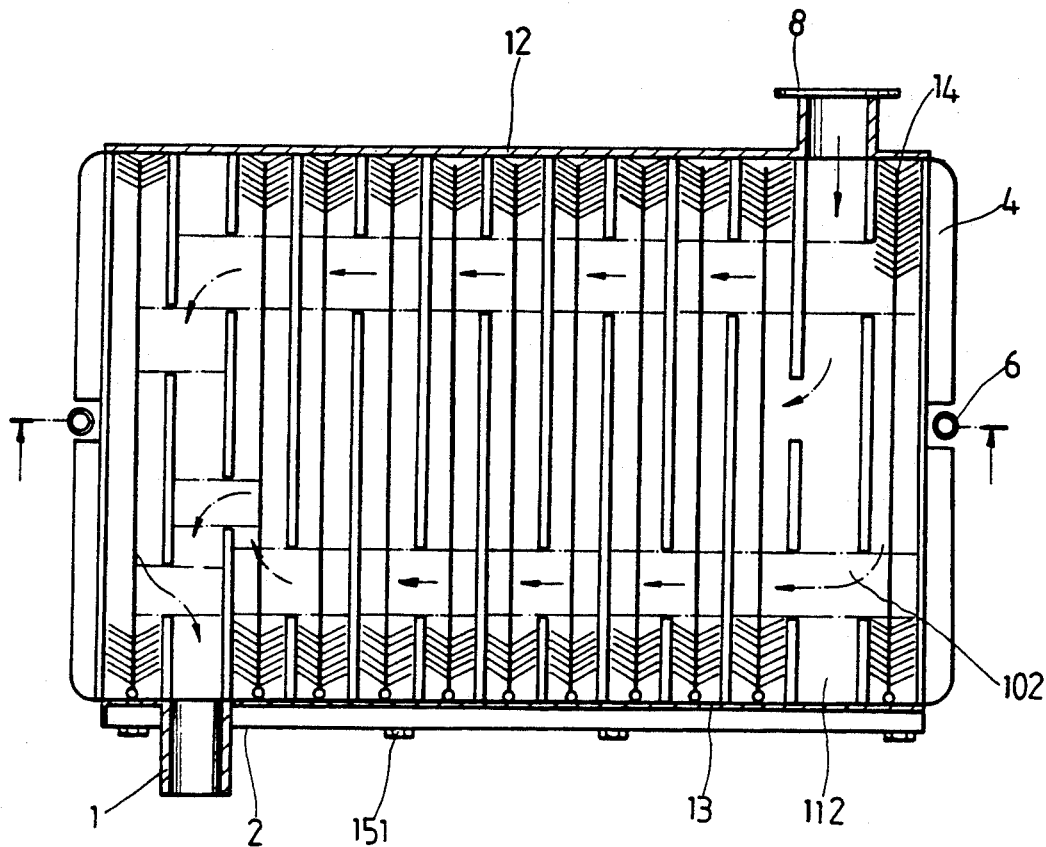
Figure 3:
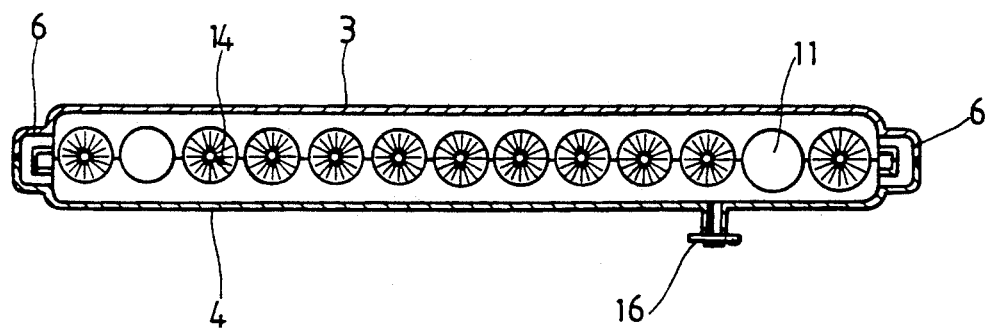
FIG. 3 is a sectional view of the exhaust pipe assembly taken along line A—A of FIG. 2, showing the arrangement of filter elements.

Referring to FIGS. 1, 2 and 3, an exhaust pipe assembly as constructed according to a first embodiment of the present invention is generally composed of an upper water container 3, a lower water container 4, a back cover 2 with an outlet pipe 1, a front wall 12 with an intake pipe 8, and two connecting tubes 6. The upper and lower water containers 3, 4 are symmetrical and connected one above the other. The upper water container 3 has a bottom wall formed of a plurality of semi-circular, longitudinal pipe sections 111 separated by a plurality of semi-circular, transverse short pipe sections 101, and a top wall coupled with a cooling water inlet pipe 9 and an overflow pipe 5. The lower water container 4 has a top wall formed of a plurality of semi-circular, longitudinal pipe sections 112 separated by a plurality of semi-circular, transverse short pipe sections 102 (see FIG. 2). The upper water container 3 and the lower water container 4 are fixed together by means of the two opposite lateral sides are sealed so that the semi-circular, longitudinal pipe sections 111, 112 and the semi-circular, transverse short pipe sections 101, 102 are respectively matched into a plurality of longitudinal pipes communicated with a plurality of transverse short pipes. Therefore a route is formed between the upper water container 3 and the lower water container 4. The front side is fixedly enclosed by the front wall 12 with the intake pipe 8 in communication with the route, and the back side is detachably enclosed by the back cover 2. The back cover 2 has a back surface covered with a layer of gasket 13 for tightly pressing against the back ends of the, longitudinal pipe sections 111, 112. A plurality of through holes 21 are provided around the border of the back cover 2 and a plurality of screw rods 15 are provided on the upper and lower water containers 3, 4 in the back corresponding to these through holes 21 for permitting the back cover 2 to be fixed to the upper and lower water containers 3, 4 by means of locknuts 151. When assembled, the outlet pipe 1 on the back cover 2 communicates with the route also. The upper water container 3 is bilaterally connected to the lower water container 4 by the two connecting tubes 6. During the process of installation, the intake pipe 8 is coupled to the pipeline of the exhaust of an engine (not shown). When installed, the cooling water is filled into the upper and lower water containers 3, 4 through the cooling water inlet pipe 9. Any excess of the cooling water will flow out of the exhaust pipe assembly through the overflow pipe 5. If the exhaust pipe assembly is installed in a motor vehicle being equipped with an air-conditioner, the cold water discharged from the air-conditioner may also be guide into the water container to lower down the temperature of the cooling water. As illustrated in FIG. 2, it can be clearly seen that the semi-circular longitudinal pipe sections 112 are crossed with the semi-circular transverse short pipe sections 102. Therefore, the exhaust is guided along the intake pipe 8 to pass through the longitudinal pipe sections and the transverse short pipe sections sinuosly and runs out of the exhaust pipe assembly via the outlet pipe 1 after having been filtrated and cooled down. Because the upper water container 3 is symmetrically constructed relative to the lower water container 4, the arrangement of the semi-circular longitudinal pipe sections 111 and the semi-circular transverse short pipe sections 101 can be figure out from FIG. 2. The intake pipe 8 and the outlet pipe 1 are disposed at diagonally, and therefore the exhaust is guided into the exhaust pipe assembly through the intake pipe 8 to flow through a circuitous route toward the outlet pipe 1. Except the longitudinal pipe sections which are directly connected to the intake pipe 8 or the outlet pipe 1, the other longitudinal pipe sections are arranged a brush type filter elements 14 respectively for separating solid matters from the exhaust passing through. As the exhaust passes through the exhaust pipe assembly, its speed and temperature are simultaneously and gradually reduced, and therefore solid matters carried in the exhaust gas are partly removed by the filter elements 14 and partly adhered to the inner wall surfaces of the longitudinal pipe sections 111, 112 and the transverse short pipe sections 101, 102. At the same time, the pressure of the exhaust is gradually reduced because of a wider space provided inside the exhaust pipe assembly for passing the exhaust, and the upper and lower water containers 3, 4 eliminate or lessen shocks caused by the high pressure of the exhaust and therefore no sonic boom or loud noise is occurred. As illustrated in FIG. 3, the lower water container 4 has a drain valve 16 for draining the cooling water contained inside. Referring to FIG. 2 again, the back cover 2 can be conveniently detached from the upper and lower water container 3, 4 by removing the locknuts 151 from the screw rods 15, and therefore the filter elements 14 can be removed from the exhaust pipe assembly and properly cleaned or renewed. The internal route of the exhaust pipe assembly may be cleaned by a suitable cleaning device, such as the cleaner for exhaust pipe disclosed in U.S. Pat. No. 5,074,007 which was invented by the present inventors and granted on Dec. 24, 1991.

Figure 4:
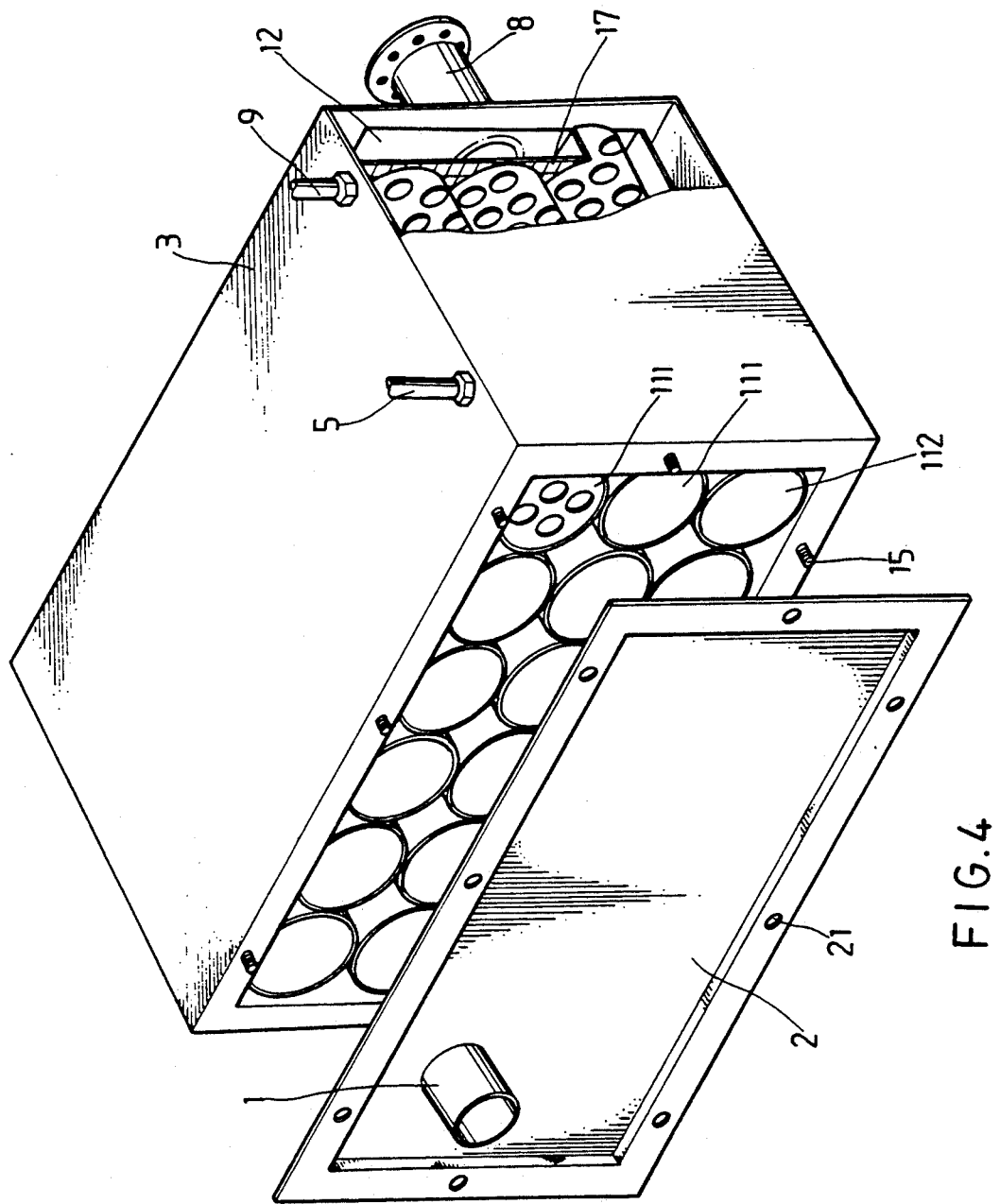
FIG. 4 is a perspective, partly exploded and partly cut-off view of a second embodiment of the exhaust pipe assembly of the present invention.
Figure 5:
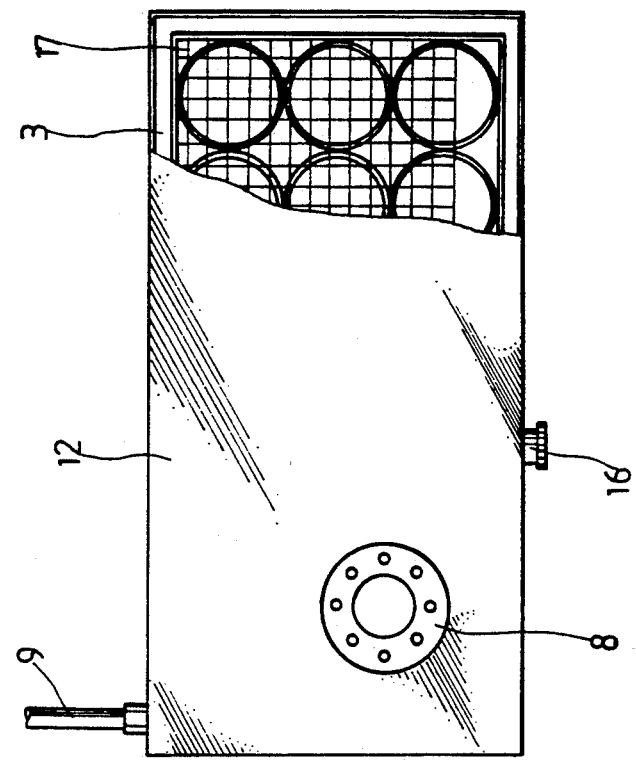
FIG. 5 is a front and partly cut-off view of the exhaust pipe assembly of FIG. 4.
Figure 6:
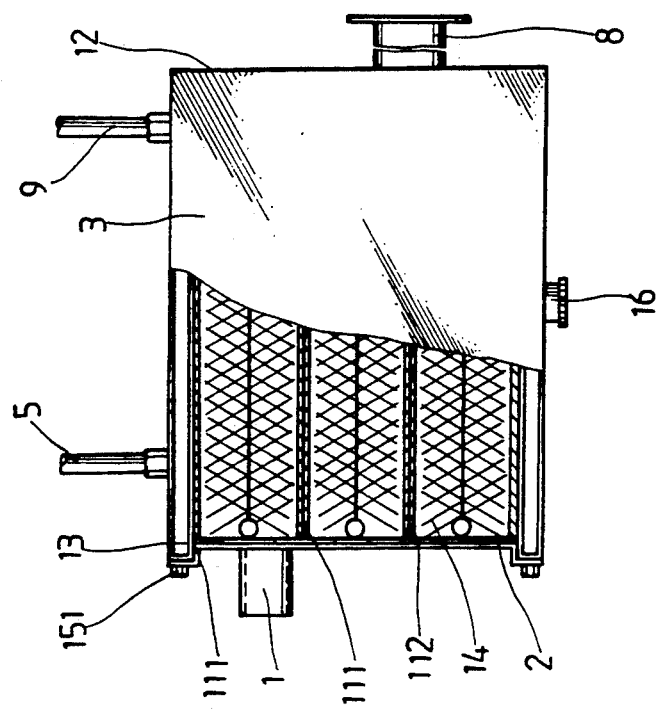
FIG. 6 is a right side and partly cut-off view of the exhaust pipe assembly of FIG. 4.

Referring to FIGS. 4, 5 and 6, therein illustrated is a second embodiment of the exhaust pipe assembly of the present invention. As illustrated in FIG. 4, the exhaust pipe assembly comprises a hollow, substantially rectangular water container 3 with a water chamber around the periphery, a front wall 12 with an intake pipe 8, a back cover 2 with an outlet pipe 1, a set of perforated pipes consisting of a bottom row of longer perforated pipes 112 and a plurality of upper rows of shorter perforated pipes 111, and a web element 17. The front wall 12 is fixed to the front opening and the back cover 2 is detachably fixed to the back opening respectively of the water container 3. The perforated pipes 111, 112 are respectively fixed one another side by side and disposed in the hollow space of the water container 3 for permitting the exhaust to pass through randomly. The water container 3 is further provided with a cooling water intake pipe 9 and an overflow pipe 5 on the top for filling a cooling water or flowing out the excess of the cooling water filled, and a drain valve 16 on the bottom for discharging the cooling water. The intake pipe 8 on the front wall 12 is adjacent to one end thereof coupled to the pipeline of the exhaust. The back cover 2 has a plurality of equal distance through holes 21 around the border through which respective screw rods 15 around the periphery of the back of the water container 3 are respectively inserted and locked with respective locknuts 151 (see FIG. 5) for permitting the back cover 2 to be fixed to the water container 3. A leakage proof gasket pad 13 is covered on the inner surface of the back cover 2 for pressing against the back end of the perforated pipes 111, 112 (see FIG. 6), and the position of the outlet pipe 1 becomes diagonal to the intake pipe 8 on the front wall 12. Therefore, the water container 3, the front wall 12 and the back cover 2 define a space for holding the rows of perforated pipes 111, 112 and the web element 17. Each longer perforated pipe 112 has a semi-circular notch at one end for supporting the web element 17 at the lower edge. The web element 17 is supported to lean against the rows of shorter perforated pipes 111 at one end. If the exhaust pipe assembly is to be installed in a motor vehicle, the cold water discharged from the air-conditioner of the motor vehicle may be guided into the water container 3 through the cooling water intake pipe 9 to lower down the temperature of the cooling water. The water container 3 is not only to cool down the exhaust but also to eliminate or lessen shocks or vibrations generated by the pressure in the exhaust. In addition, the intake pipe 8 and the outlet pipe 1 are disposed at two opposite locations diagonally so that the flow route may be extended sinuously to reduce the pressure of the exhaust gradually. Therefore, the noise generated can be muffled. The web element 17 may disperse the exhaust and retain part of the solid matters within the exhaust as the exhaust passes. Furthermore, each perforated pipes 111 or 112 has a brush type filter element 14 inside respectively for straining the exhaust passing through. Similar to the aforesaid first embodiment of the present invention, the back cover 2 can be conveniently detached from the water container 3 by removing the locknuts 151 from the screw rods 15, and therefore the filter elements 14 and the whole set of the perforated pipes 111, 112 may be taken out and cleaned. The perforated pipes 111, 112 may also be cleaned by the cleaner disclosed in U.S. Pat. No. 5,074,007 or any other suitable cleaning devices. The number of rows of perforated pipes 112 may be increased or reduced according to different requirements. In this second embodiment, the perforated pipes are disposed horizontally. As an alternate form, the perforated pipes may be disposed vertically. Of course, the positions of the cooling water intake pipe, the overflow pipe, and the drain valve should be properly changed if the perforated pipes are disposed vertically.

Figure 7:
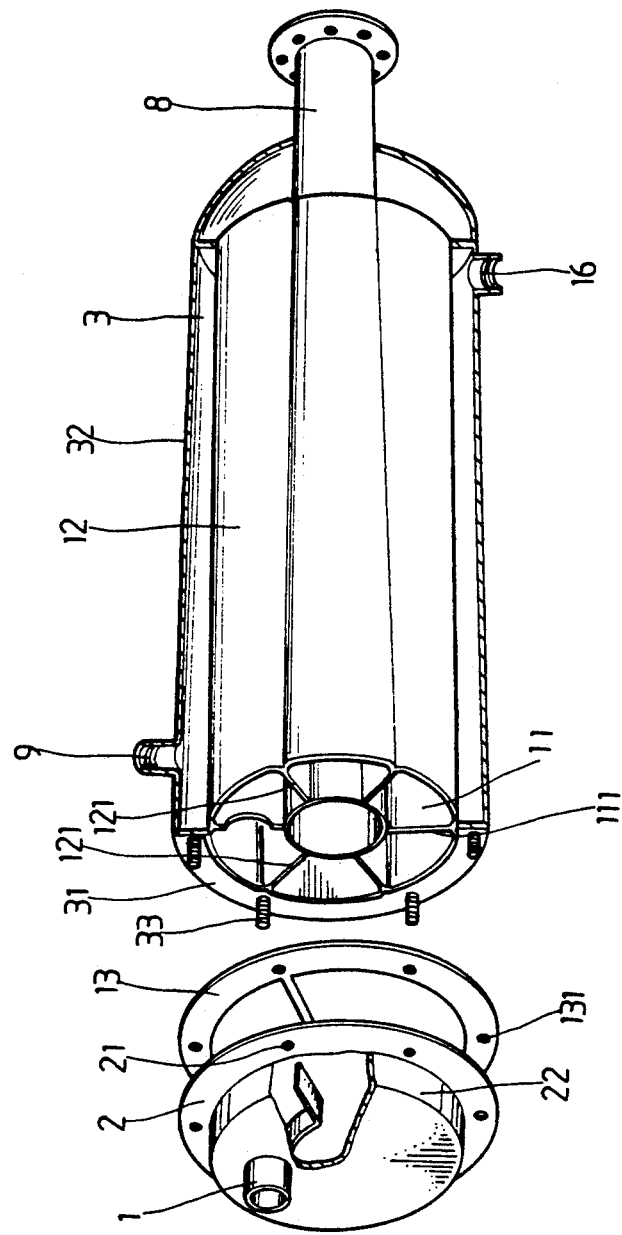
FIG. 7 is a perspective, partly exploded partly cut off view of a third embodiment of the exhaust pipe assembly of the present invention.
Figure 8:
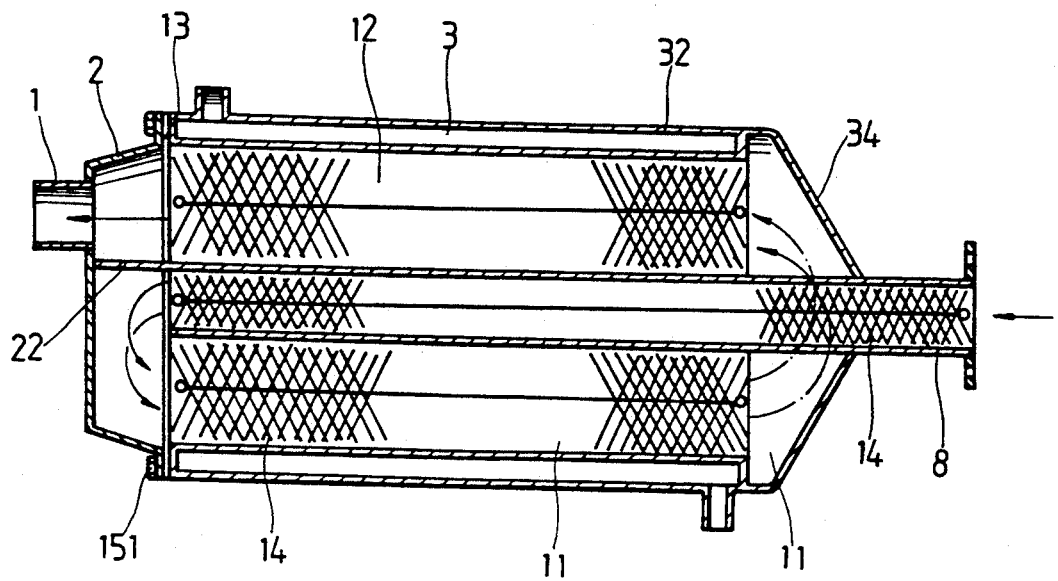
FIG. 8 is a side assembly view in sectin of the exhaust pipe assembly of FIG. 7.
Figure 9:
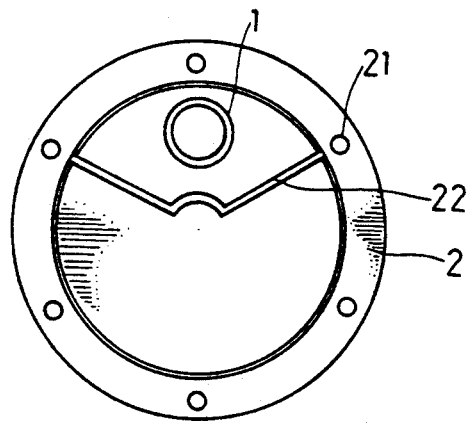
FIG. 9 is a front view of the back cover of the exhaust pipe assembly of FIG. 7.

Referring to FIGS. 7, 8 and 9, therein illustrated is a third embodiment of the exhaust pipe assembly of the present invention. As illustrated in FIG. 7, the exhaust pipe assembly comprises an annual cylindrical water container 3 with a water chamber surrounded around a circular periphery for holding a cooling water, a cooling water intake pipe 9 and a drain valve 16 on the outer wall 32 of the water container 3 at two opposite locations for filling a cooling water into the water chamber or carrying off the contained cooling water, and an elongated intake pipe 8 extended through its length along the central axis of the water container 3 with one end exposed to the outside for connecting to the exhaust pipeline an engine. The hollow space between the inner wall of the water container 3 the intake pipe 8 is divided into a plurality of elongated lower and upper sector chambers 11, 12 by radial division walls 111 and 121. As shown in FIG. 7, there are four lower sector chamber and two upper sector chamber. Therefore, the cylindrical inside wall of the cylindrical water container 3 forms the cylindrical outside wall of the sector chambers 11, 12. The water container 3 has both ends blocked by a circular plate 31 respectively. A front end wall 34 is extended out of the outer wall 32 and fixed with the intake pipe 8 at the exposed end part to define a flow space 10 for the exhaust. The water container 3 has a plurality of screw rods 33 around the circular plate 31 at the rear end for mounting a back cover 2 and a gasket ring 13. The back cover 2 has a hat like outline with a outlet pipe 1 at the upper portion. The back cover 2 and the gasket ring 13 each has a plurality of equal angular distance through holes 21 and 131 respectively through which the screw rods 111 are respectively inserted and locked with respective locknuts 151 (see FIG. 8). Therefore, the back cover 2 can be detachably fastened to the water container 3 to block its open rear end, and the gasket ring 13 is peripherally sealed between the water container 3 and the back cover 2. A partition 22 which has a cross section of somewhat V shape is dispoed in the back cover 2 to separate the upper elongated, sector chambers 12 from the lower elongated, sector chambers 11 while the back cover 2 is fixed to the water container. Correspondingly, the gasket ring 13 also has a portion provided with a shape same as the partition 22 for being sandwiched between the partition 22 and the radial division walls 121. The outlet pipe 1 is extended out of the back cover 2 backward and located to communicate with the upper sector chambers 12. Therefore, the outlet pipe 1, the upper sector chambers 12, the lower sector chambers 11 and the intake pipe 8 constitute a circuitous route, and the exhaust is guided into the circuitous route and moves out of the exhaust pipe assembly. It can be seen in FIG. 8, that the arrows indicate the flowing direction of the exhaust, which is guided into the exhaust pipe assembly through the intake pipe 8, flows into the lower sector chambers 11 from the rear end, then moves out of the lower sector chambers 11 through the front end, and then flows upwards and turns into the upper elongated, sector chambers 12, and finally flows out of the exhaust pipe assembly through the outlet pipe 1. Similarly the intake pipe 8, the upper and lower sector chambers 11, 12 are respectively disposed a brush type filter element 14 inside. Because the exhaust is sinuously guided through the exhaust pipe assembly and cooled down by the cooling water in the water container 3, the dirt contained in the exhaust may adhere on filter elements, the inner surfaces of the sector chambers 11, 12 and the intake pipe 8, respectively. As the exhaust passes through the sector chambers 11, 12, the pressure of the exhaust may gradually reduced. In addition, the water container 3 may resist shocks and vibrations generated by the exhaust. Therefore, the exhaust pipe assembly may act as a muffler. Furthermore, the back cover 2 can be conveniently detached from the water container 3 by removing the locknuts 151 from the screw rods 15, for performing cleaning works for filter elements, the inner walls of the sector chambers 11, 12 and the intake pipe 8.

It is noted that the aforesaid first and second embodiments of the present invention are very suitable for treating the exhaust of an automobile, and the third embodiment is suitable for use in a motorcycle. Of course, these embodiments may also be used for treating the exhaust produced from any other internal combustion engine.

What is claimed is:

1. An exhaust pipe assembly comprising
   a rectangular upper water container with a plurality of longitudinal pipe halves and a plurality of transverse short pipe halves at the bottom surface,
   a rectangular lower water container with a plurality of longitudinal pipe halves and a plurality of transverse short pipe halves at the upper surface,
   a front cover with an intake pipe,
   a back cover with an outlet pipe,
   a plurality of connecting tubes, and
   a plurality of brush type filter elements,
   wherein said upper water container and said lower water container are fixed with each other so that each of said plurality of longitudinal pipe halves and each of said plurality of transverse short pipe halves on said upper water container may coincide with those on said lower water container respectively to form a circuitous route; said front cover and said back cover are located at either end of said fixed with each other upper and lower water containers with said intake pipe and said outlet pipe communicating with said circuitous route respectively; said plurality of connecting tubes are bilaterally connected with said lower water container and said upper water container; and said plurality of filter elements are disposed longitudinally in said circuitous route respectively.

2. The exhaust pipe assembly according to claim 1 wherein said back cover is detachably fixed.

3. An exhaust pipe assembly comprising
   a hollow, rectangular water container,
   a front cover, with an intake pipe,
   a back cover, with an outlet pipe,
   a plurality rows of filter pipes, with perforated pipe wall,
   a web element, and
   a plurality of brush type filter elements;
   wherein said Water container is provided with a water chamber surrounding the periphery so that said plurality rows of filter pipes may be disposed in the hollow space within said water container, said front cover being fixed at one end part of said water container and said back cover being detachably fixed at the other end part of said water container, said web element being disposed at the front end of said plurality rows of filter pipes, and said plurality of filter elements being positioned in said plurality of rows of filter pipes respectively.

4. The exhaust pipe assembly according to claim 3 wherein said plurality of rows of filter pipes include a row of longer filter tubes at the bottom, and at least a row of shorter filter pipes above said row of longer filter pipes, each of said row of longer filter pipes having a front end formed into a semi-circular notch for supporting said web element.

5. The exhaust pipe assembly according to claim 3 wherein said back cover is detachably fixed to the rear end of said hollow, rectangular water container.

6. An exhaust pipe assembly comprising
   a hollow, cylindrical water container with a water chamber surrounding the periphery and a blocked end,
   an elongated intake pipe,
   a back cover, with an outlet exhaust pipe,
   a plurality of radial division walls, and
   a plurality of brush type filter elements;
   wherein said elongated intake pipe is longitudinally located centrally within the hollow space of said water container with an end extending out of said blocked end, said plurality of radial division walls being fixed between said water container and said intake pipe to divide the space thereof into plurality of upper elongated sector chambers and a plurality of lower elongated sector chambers, and said back cover being detachably fixed to the open end of said hollow space.

7. The exhaust pipe assembly according to claim 6 wherein said filter elements are respectively disposed in said elongated intake pipe and said upper and lower elongated sector chambers.

8. The exhaust pipe assembly according to claim 6 wherein said back cover is provided with a partition for separating the rear end of said plurality of upper elongated, sector chambers from said plurality of lower elongated sector chambers.

9. The exhaust pipe assembly according to claim 8 wherein a gasket ring is peripherally sealed between said back cover and the rear end of said water container and provided with a part having a shape corresponding to said partition.

10. The exhaust pipe assembly according to claim 6 wherein said plurality of lower sector chambers are communicating with said intake pipe, said plurality of upper sector chambers is communicating with said outlet pipe, and said lower sector chambers are communicating with said plurality of upper sector chambers.

* * * * *